United States Patent [19]

Kato

[11] Patent Number: 5,099,335

[45] Date of Patent: Mar. 24, 1992

[54] IMAGE COMMUNICATION APPARATUS

[75] Inventor: Yoshiaki Kato, Kurume, Japan

[73] Assignee: Canon Kabushiki Kaisha, Tokyo, Japan

[21] Appl. No.: 410,958

[22] Filed: Sep. 22, 1989

Related U.S. Application Data

[62] Division of Ser. No. 873,541, Jun. 12, 1986, Pat. No. 4,885,641.

[30] Foreign Application Priority Data

| Jun. 17, 1985 | [JP] | Japan | 60-131363 |
| Jun. 17, 1985 | [JP] | Japan | 60-131364 |
| Jun. 17, 1985 | [JP] | Japan | 60-131365 |
| Jun. 17, 1985 | [JP] | Japan | 60-131366 |
| Jun. 17, 1985 | [JP] | Japan | 60-131367 |
| Jun. 17, 1985 | [JP] | Japan | 60-131368 |
| Jun. 17, 1985 | [JP] | Japan | 60-131369 |

[51] Int. Cl.[5] .................. H04N 1/21; H04N 1/23
[52] U.S. Cl. ..................... 358/296; 358/404; 358/444; 358/468
[58] Field of Search ......... 358/296, 401, 400, 404, 358/426, 444, 449, 451, 443, 468, 300

[56] References Cited

U.S. PATENT DOCUMENTS

| 4,353,097 | 10/1982 | Takeda et al. | 358/451 |
| 4,521,813 | 6/1985 | Yoshida | 358/404 |
| 4,568,973 | 2/1986 | Ishida | 358/451 |
| 4,589,035 | 5/1986 | Yamanishi | 358/296 |
| 4,743,975 | 5/1988 | Ijuin | 358/404 |
| 4,772,955 | 9/1988 | Kurahayashi et al. | 358/444 |
| 4,814,890 | 3/1989 | Kato | 358/443 |
| 4,814,894 | 3/1989 | Yoshida | 358/449 |

Primary Examiner—Benjamin R. Fuller
Assistant Examiner—Scott A. Rogers
Attorney, Agent, or Firm—Fitzpatrick, Cella, Harper & Scinto

[57] ABSTRACT

An image communication apparatus is provided which has various novel functions: a function of eliminating lacking portions in an image printed with a printer incorporating a so-called separation process; a function of shortening the time required for a multi-copy; a function of selecting a maximum resolution of the apparatus without using the same resolution as used during reading; a function of visualizing reading control data in a memory copy mode; and a function of compulsorily setting the manual reception mode when the apparatus at the automatic reception mode is not prepared for reception.

8 Claims, 12 Drawing Sheets

FIG. 9A
FIG. 9B
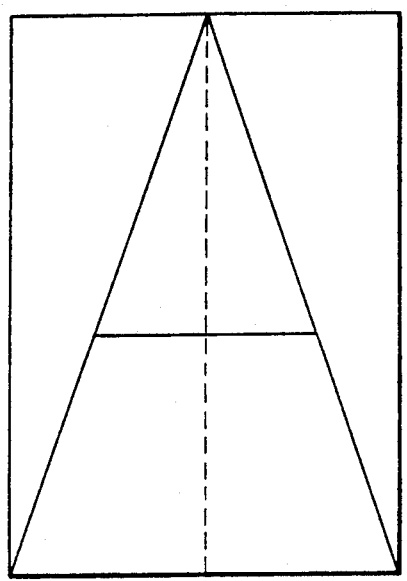
ORIGINAL DOCUMENT
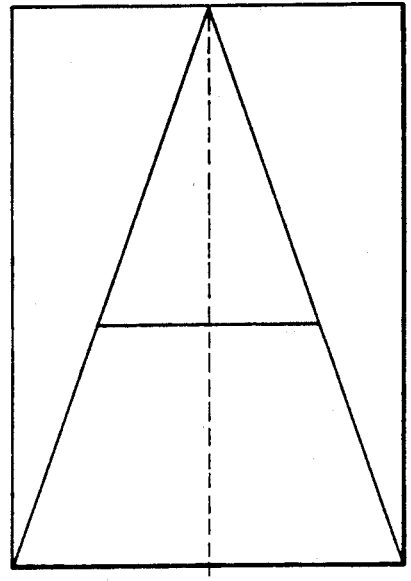
ORIGINAL DOCUMENT
CENTER DISPLACEMENT
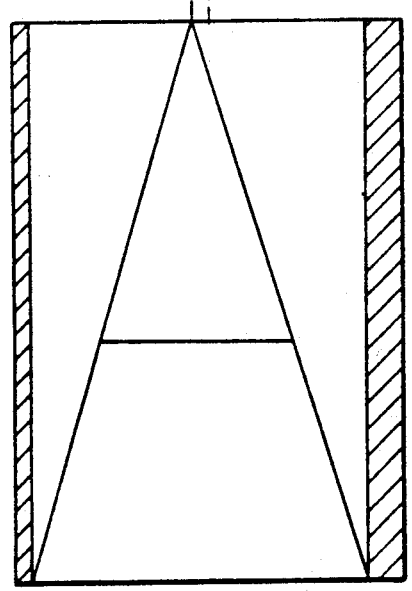
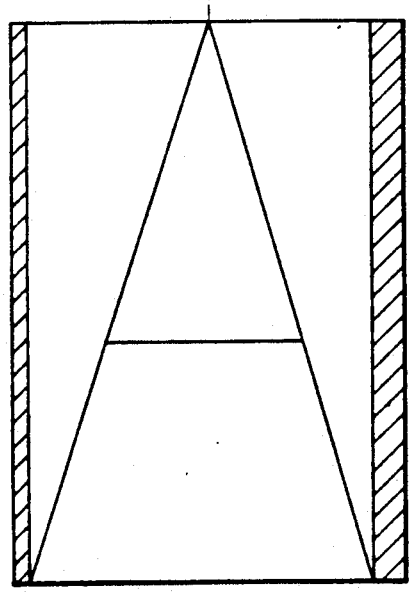

ORIGINAL DOCUMENT

EFFECTIVE RECORDING AREA

NON-RECORDING AREA

IMAGE COMMUNICATION APPARATUS

This application is a division of application Ser. No. 06/873,541 filed June 12, 1986, now U.S. Pat. No. 4,885,641.

BACKGROUND THE INVENTION

The present invention relates to an image communication apparatus for transmission and/or reception of image data.

A transfer type printer using an electrophotographic technology, such as a laser beam printer, liquid crystal shutter array printer, or LED printer has excellent properties in regard of speed and resolution. Such a printer has been proposed for use with a facsimile apparatus.

In a transfer type printer, a toner image on a photosensitive body or an insulator is transferred to a recording paper while the photosensitive body or the insulator contacts the recording paper. After transfer, a so-called separation process is needed to separate the recording paper from the photosensitive body or the insulator.

If a separation belt is used in the separation process, non-recording areas have to be provided at opposite lateral end portions of the recording paper, on the order of several millimeters in size.

Such a printer therefore cannot record the entire area of a received image and the lateral end portions of the image are omitted. As shown in FIG. 10A an A4 size original document has a width of 210 mm, while the effective recording area of a laser beam printer is 198 mm in the main scan direction. Therefore, non-recording areas exist, for example, a 4 mm width at the left side and ann 8 mm width at the right side.

A multi-copy function is one of various functions of a facsimile apparatus. With the multicopy function, an image read from an original document can be printed out two or more times.

Particularly, an original document is read with a reader, and readout image information is sequentially stored in a page memory within an image memory. After the entire image information is stored in the page memory, the image information is then read from the page memory to be printed with a printer. At this time, the present number of papers is decremented by 1. After completion of a first print, the above operations wherein image information is read from the page memory and printed, are repeated, and the preset number of papers is sequentially decremented by 1. The multi-copy operation terminates when the preset number of papers becomes 0.

There is a tendency for facsimile apparatus to be provided with a memory of large capacity, and consequently the number of pages of a page memory becomes large. Thus, in a multi-copy operation, the number of pages of the page memory is very large nowadays.

Under such conditions, there arises however a problem that the time required for a multi-copy operation becomes long in proportion with the capacity of the page memory.

Effective use of a memory is generally achieved by use of compression-coded data. However, regardless of a same size original document, the amount of memory used for coded data varies depending on the amount of image information. Therefore, in some cases, a memory becomes insufficient for storing even a one-page image, and a copy thereof cannot be obtained.

During a copy mode operation, first an original document is read and the read-out image information is temporarily stored in an image memory. Thereafter, the image information is read from the image memory to be printed with the printer. If a plurality of resolution modes are provided in the facsimile apparatus, a desired resolution mode is selected to read the original document. For example, in the case of a facsimile apparatus having a standard mode and a fine mode, an original document is read in a designated one of the two modes, and the image is printed in the same mode used for reading.

However, in the copy mode of the conventional facsimile apparatus, although the cost of copying is the same irrespective of the resolution mode, only a low quality print is obtained in a low resolution mode.

There is another copy mode, called a memory copy mode, which makes a copy after some time after the image data is stored in a memory. Various conditions are set at the time when the image data is stored in the memory. The conditions include resolution, presence or absence of half tone, destination, page number and so on.

The number of conditions is large and the condition setting is rather complicated. Thus, it may be difficult to remember the conditions later with certainty.

A facsimile apparatus has generally an automatic reception mode as well as a manual reception mode. The automatic reception mode is convenient since it performs an automatic reception while the operator is out during night or is busy at other work.

In the automatic reception mode which starts a reception operation upon calling from a line, if the apparatus at the reception side is not prepared for a reception, for example, due to no printing paper, then an error indication signal is sent to the calling station. In this case, there arises some problems that the calling side cannot know the reason of the error while the called party does not become aware of no paper.

SUMMARY OF THE INVENTION

It is an object of the present invention to provide an image communication apparatus for transmission and/or reception of image data capable of solving the above-described prior art problems.

It is another object of the present invention to provide an image communication apparatus which does not produce a received image lacking a portion of the original image.

It is a further object of the present invention to provide an image reproducing apparatus capable of shortening the time required for a multi-copy operation.

It is a still further object of the present invention to provide an image communication apparatus having a copy mode with a high copy quality.

It is another object of the present invention to provide an image communication apparatus capable of readily visualizing, when an image stored in a memory is copied, i.e. when a memory copy mode is used, the reading control data such as a resolution, the presence or absence of half-tone, and communication control data such as destination and transmission mode.

It is a further object of the present invention to provide an image communication apparatus capable of compulsorily setting a manual reception mode when the apparatus set at an automatic reception mode is not prepared for reception, for example, due to no printing paper.

The above and other objects, features and advantages of the present invention will become apparent from the following detailed description of the preferred embodiment and the accompanying drawings.

BRIEF DESCRIPTION OF DRAWINGS

FIGS. 9A and 9B show an example of image center displacement;

DETAILED DESCRIPTION OF THE PREFERRED EMBODIMENTS

Figure 1:
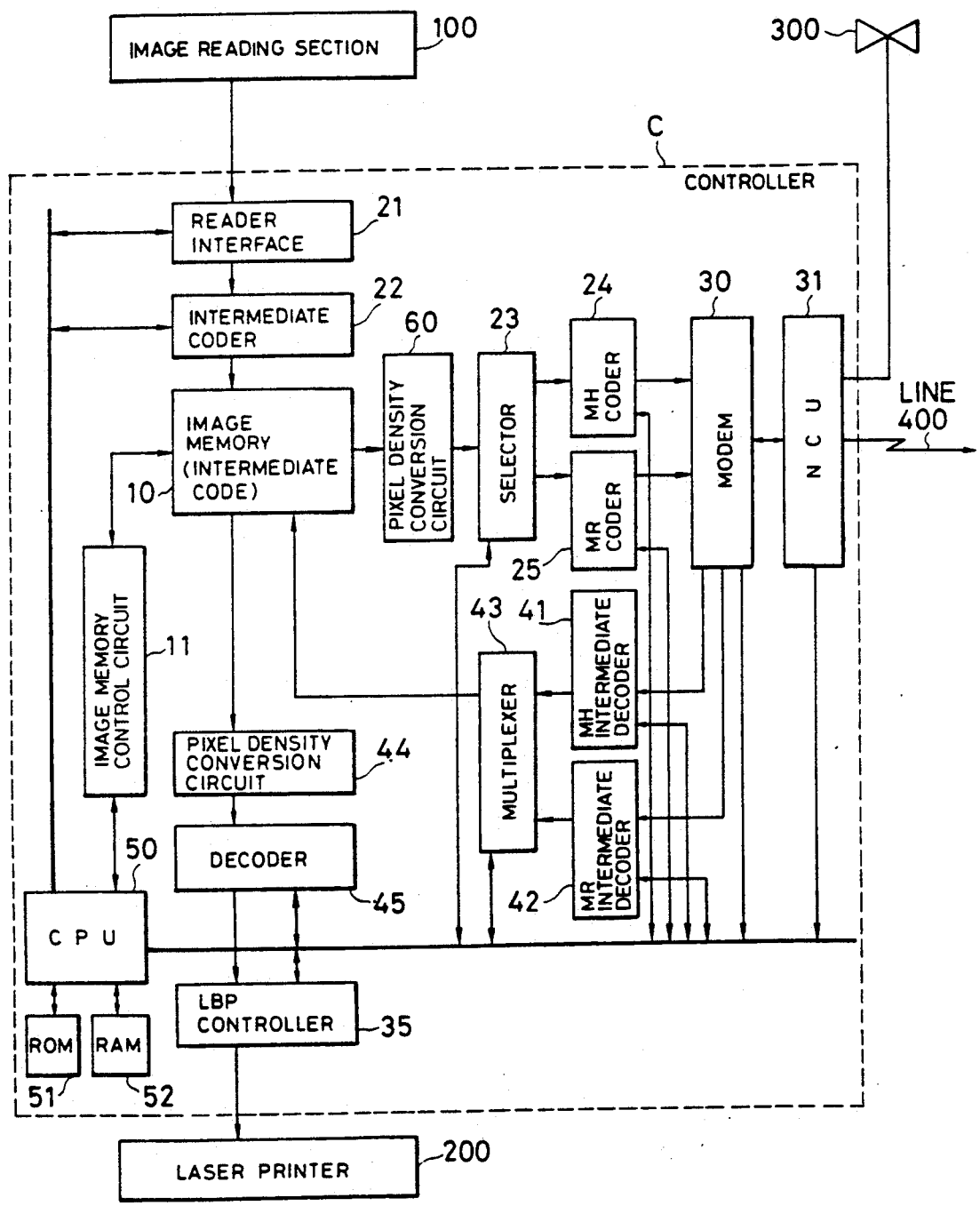
FIG. 1 is a block diagram of a facsimile apparatus according to an embodiment of the present invention.

FIG. 1 is a block diagram of the facsimile apparatus according to the preferred embodiment of the present invention.

In this embodiment, the facsimile apparatus comprises an image reading section 100 of an image reading system, a transfer type laser beam printer 200 using an electrophotographic technology (hereinafter called laser printer) of a recording system, and a controller C for controlling the image reading section 100 and the laser printer 200.

Figure 2:
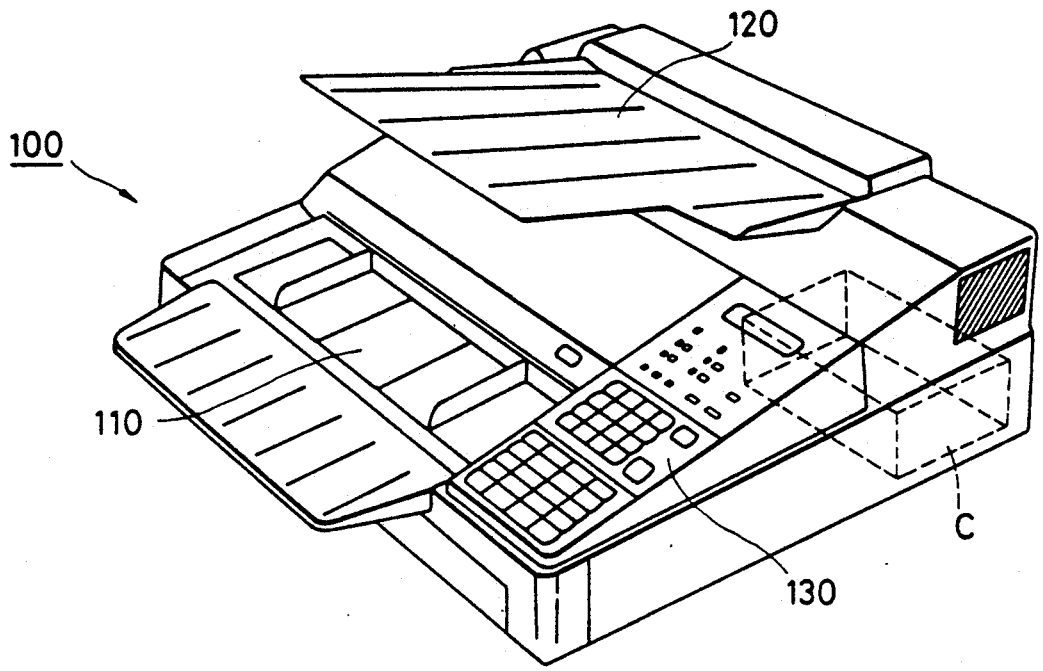
FIG. 2 is a perspective view showing an example of the image reading section.

FIG. 2 is a perspective view of the image reading section 100.

An original document is inserted from an original document inserting section 110 for conversion of image information into electrical signals by an image reading means mounted on the image reading section, and is ejected onto the paper output tray 120. The image reading section 100 is provided with a control panel 130 and the controller C for controlling the image reading section 100 and the laser printer 200.

Figure 3:
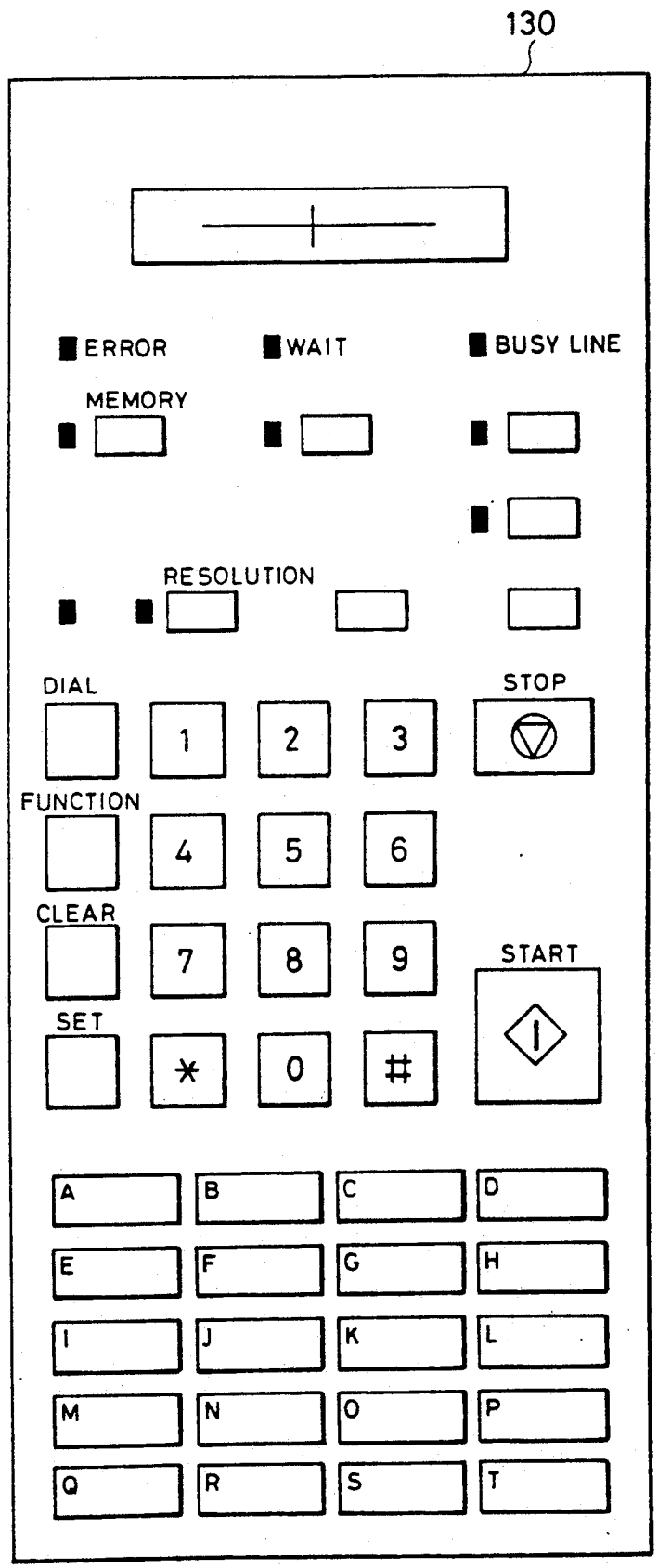
FIG. 3 shows an example of the control panel.

FIG. 3 shows the control panel 130 which performs various functions, such as selection of a standard mode and a fine mode, designation of a mini-fax and a halftone, dialing of a receiving station, and so on.

Figure 4:
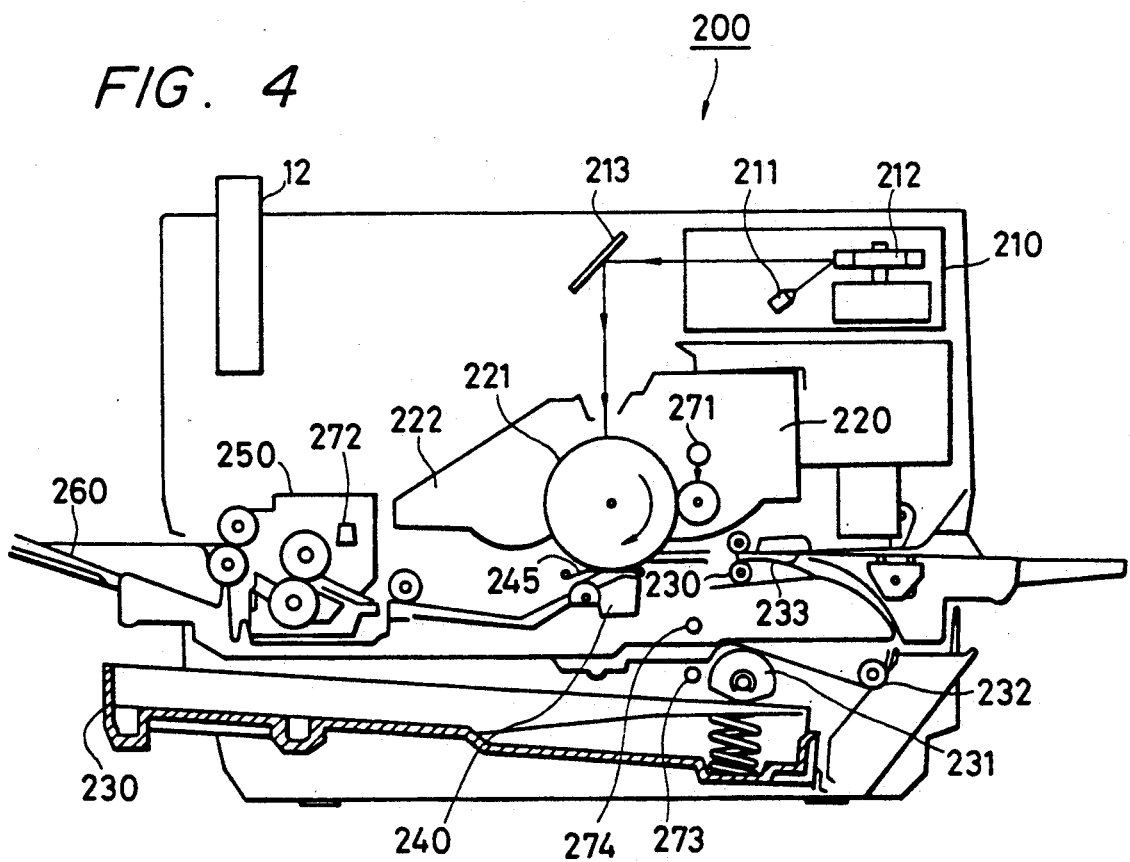
FIG. 4 is a vertical cross-sectional view showing an example of a laser printer.

FIG. 4 is a vertical cross-sectional view of an example of the laser printer 200 which comprises an exposure unit 210, a developing unit 220, a paper cassette 230, a transfer unit 240, a fixing unit 250, and a stacker unit 260. The exposure unit 210 has a laser unit including a laser 211 and a scanner including a polygon mirror 212.

The developing unit 220 has a photosensitive drum 221 and a cleaner 222, the developing unit 220 visualizing a latent image formed on the drum 221 by the reflection mirror 213.

A sheet of recording paper in the paper cassette 230 is conveyed via a paper feed roller 231 and a paper conveying roller 232 and temporarily stopped at a registration shutter 233. At this stop, the paper feed is synchronized with laser radiation and rotation of the drum 221 and thereafter, the recording paper is fed to the drum 221 via delivery rollers 234. A toner image is transferred at the transfer unit 240 to the recording paper which in turn is separated from the drum 221. The toner image is then fixed on the recording paper at the fixing unit 250.

The operation timing controls with respect to the paper transportation, image forming, developing, transfer, fixing and so on are performed under control of a laser beam printer (LBP) controller 35 to be described later, in accordance with stored data in an image memory 10 to be described later.

The laser printer 200 is further provided with a toner density sensor 271 for detecting the toner density, a temperature sensor 272 for detecting the temperature of the fixing unit 250, and an LED 273 and photoreceiving element 274 for detecting the presence of recording paper.

Referring now back to FIG. 1, a description will be given of the controller C, which is mainly constructed of a transmission system for transmitting data read from the image reading section 110 to a receiving station, a reception system for transferring data received from a sending station to the laser printer 200, and a CPU 50 for controlling the entirety of the controller C.

The transmission system is constructed of: a reader interface 21; an intermediate coder 22 for compression-coding readout data into an intermediate code; the image memory 10 for storing the intermediate code; a pixel density conversion circuit 60 for lowering the pixel density in accordance with the functions the receiving station has; a selector 23 for selecting an MH coder 24 or an MR coder 25; a modem 30 for modulating a transmission signal; and an NCU 31 for controlling the network.

The reception system is constructed of: the NCU 31, the modem 30 for demodulating a reception signal; an MH intermediate decoder 41, an MR intermediate decoder 42, a multiplexer 43, the image memory 10 for storing an intermediate code from the multiplexer 3; a pixel density conversion circuit 44 having a dot superposition means; a decoder 45 for converting the intermediate code into a video signal, and the LBP controller 35 for controlling the laser printer 200.

An image memory control circuit 11 performs the overall management of the image memory 10, such as regarding the remaining capacity of the memory, read-/write operation and the like.

The CPU 50 controls the entirety of the controller C. The control program of the CPU 50 is stored in a ROM 51, and data necessary for program execution is stored in a RAM 52.

The image memory 10 delivers stored data during transmission at the speed conforming with the transmission speed of a line 400, or during reception stores one page data and transfers it to a pixel density conversion circuit 60. If the image memory 10 is used as a retention memory, the information is retained stored until a multicopy is completed. If the image memory 10 is used as a memory for broadcast communication, the information is maintained stored until the broadcast communication is completed. In the figure, reference numeral 300 represents a telephone set.

Next, the operation of the above embodiment will be described.

Figure 5:
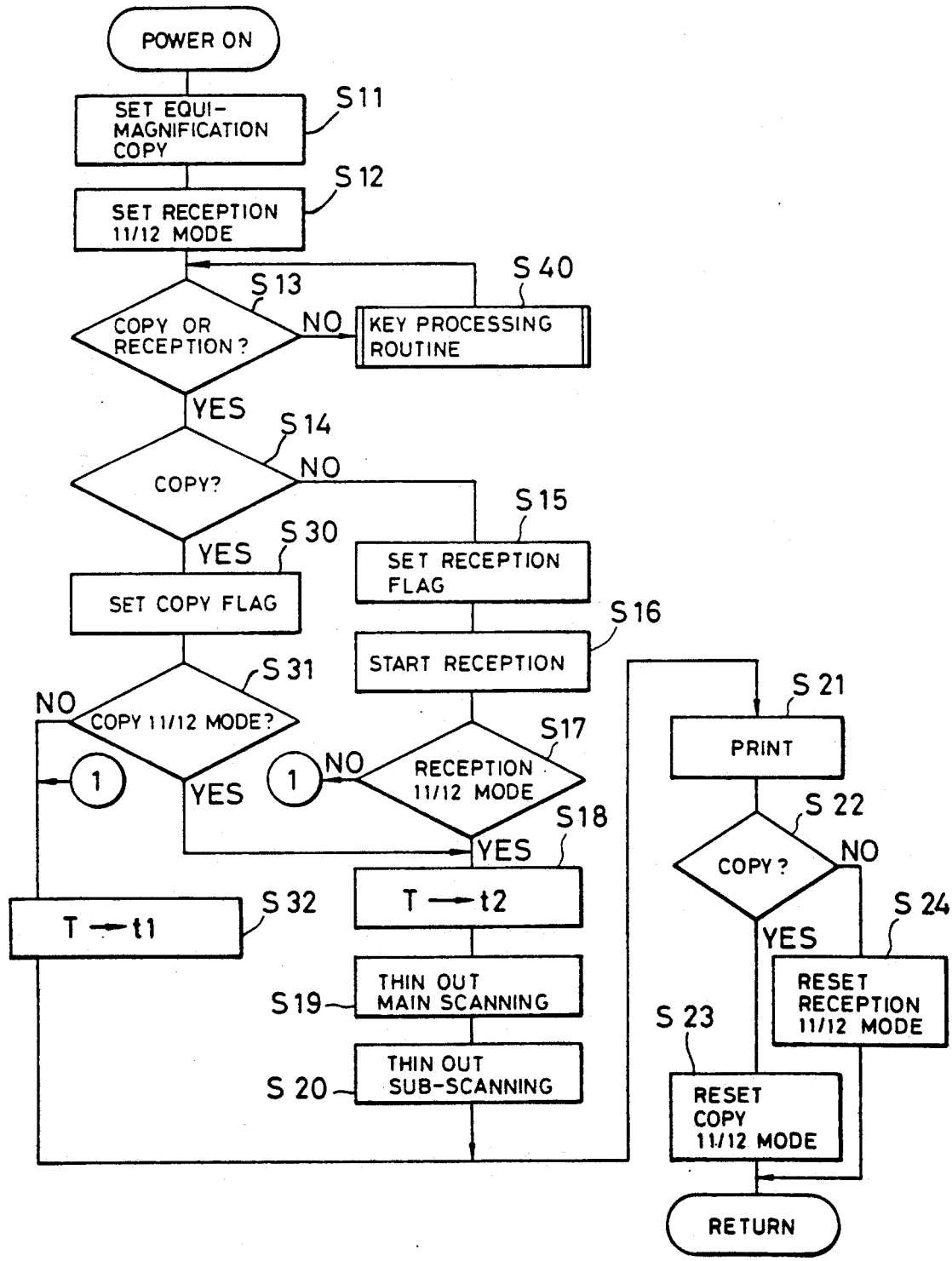
FIG. 5 is a flow chart illustrating the operation of the embodiment of FIG. 1.

FIG. 5 is a flow chart illustrating the operation of the embodiment of the invention.

Figure 10A:
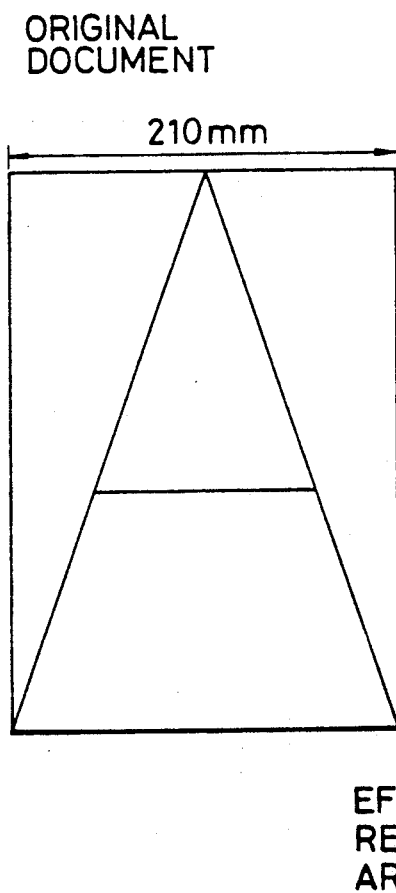
FIGS. 10A and 10B illustrate an example of a print without reduction.
Figure 10B:
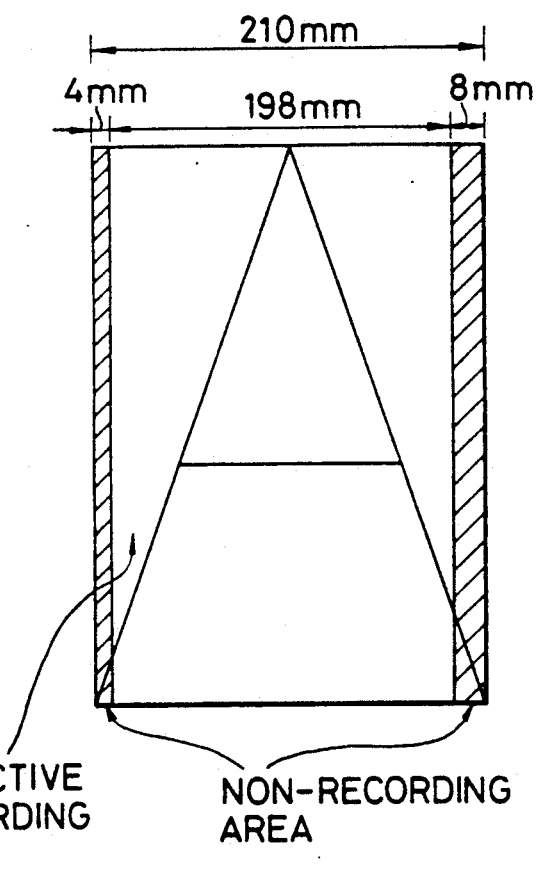

First, assuming that an equi-magnification is used during copying and an 11/12 reduction is used during receiving, the equi-magnification copy mode and the reception 11/12 mode are so set during initialization (S11, S12). The reception 11/12 mode compulsorily reduces the longitudinal and lateral lengths of a transmitted original document by 11/12 during reception. That is, the width 210 mm of an original document shown in FIG. 10A is reduced to 198 mm (as shown in FIG. 10B) corresponding to the effective recording area of the laser beam printer. (Although 198/210 is not equal to 11/12, the latter fraction is used here for convenience of description.) In this case, the length in the longitudinal direction is also reduced to obtain the same longitudinal and lateral ratio as of the original document.

Next, it is judged if a copy mode is to be performed or a reception is to be performed (S13). If neither copying nor reception is to be performed, then a key processing routine (S40) shown in detail in FIG. 6 follows. At the time when the power is turned on, since neither copying nor reception is to be performed, the process automatically advances to the key processing routine.

In the key processing routine (FIG. 6), it is judged if the copy 11/12 key has been depressed (S41). The copy 11/12 key is used for copying an original document at a 11/12 reduction. If the copy 11/12 key has been depressed, a copy 11/12 flag is set (S42), and a copy 11/12 LED is turned on (S43) for indicating the adoption of the copy 11/12 mode and the process stands by.

If the copy 11/12 key has not been depressed, then it is judged if the reception 11/12 switch is reset or not (S44). The reception 11/12 switch mounted within the facsimile apparatus is used for resetting the reception 11/12 mode by software, and is called a software switch. If the reception 11/12 switch is reset, a reception 11/12 flag is reset (S45) and the step stands by. If not, other key processing is performed (S46) and thereafter, the process stands by.

Referring back to FIG. 5, if a copy mode or a reception is met at step S13, it is checked if the apparatus is set at a copy mode (S14). If not, it is in a reception state and a reception flag is set (S15) to start a reception (S16).

It is judged if the apparatus is set at a reception 11/12 mode (S17). If affirmative (i.e., not reset by the soft-switch), a wait time T is set at t2. The wait time T is the time from when a horizontal sync signal is generated to when an image signal is applied to the semiconductor laser 211.

Figure 7:
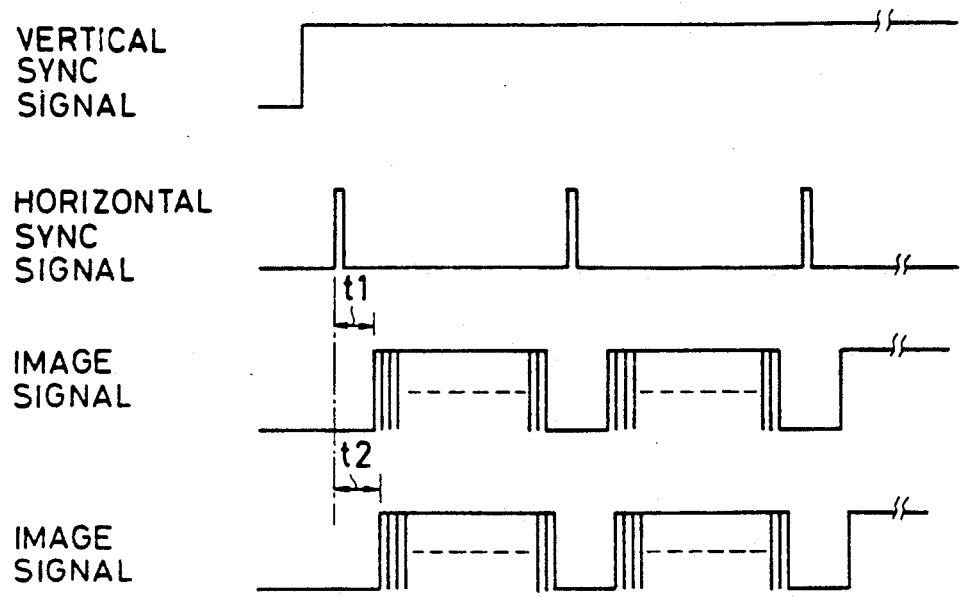
FIG. 7 is a timing chart illustrating the image center displacement in the embodiment of FIG. 1.

The longer the wait time T is, the more the position of image to be recorded relative to the printing paper is displaced to the right. In other words, the longer the wait time T is, the more the center of the image relative to the printing paper is displaced to the right. In the equi-magnification copy, the wait time T is set at t1 which is related to t1 by t1<t2. Such example is shown in FIG. 7.

Figure 8:
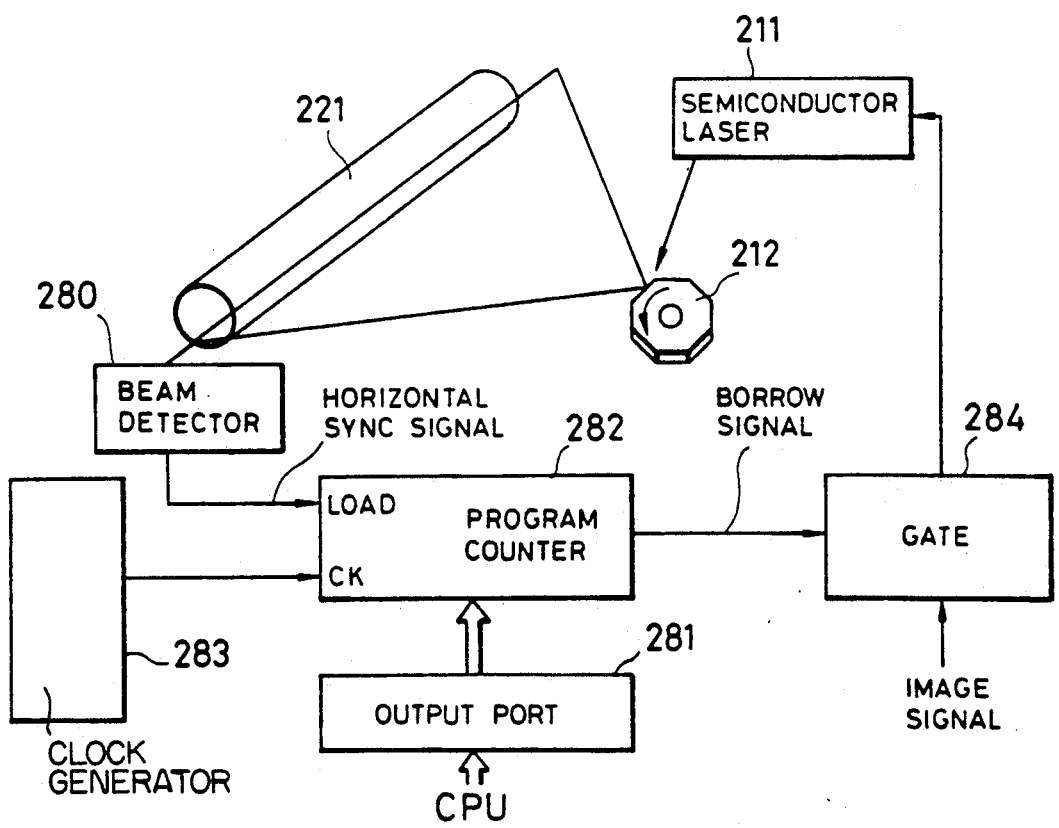
FIG. 8 is a block diagram showing how the timings of FIG. 7 are obtained.

FIG. 8 is a main circuit portion for displacing the image center relative to a printing paper.

A beam detector 280 is set near the end of the drum 221 for generating a horizontal sync signal upon detection of a beam. An output port 281 receives information t1 (or t2) used as the wait time T from the CPU 50 and retains the information.

A program counter 282 starts counting clocks from a clock generator 283 when a horizontal sync signal is generated. After counting clocks corresponding in number to the time t1 (or t2), the program counter 282 outputs a borrow signal. A gate 284 opens when it receives the borrow signal so that an image signal is applied to the semiconductor laser 211.

As a result, the image is printed after the lapse of time t1 (or t2) designated by the CPU 50 from when a horizontal sync signal is generated, so that the position of the image center relative to a printing paper can be adjusted as desired. An example of such adjustment of the image center is shown in FIGS. 9A and 9B, wherein FIG. 9A shows an image with center displacement and FIG. 9B shows an image without center displacement after adjustment. In the example shown in FIGS. 9A and 9B, only the length in the lateral direction is reduced.

Again in the flow chart of FIG. 5, after setting the wait time T at t2 at step S18, main scanning is thinned out (S19). Since a 11/12 reduction is to be performed, a one-dot signal is thinned out every 12 dots. Sub scanning is also thinned out (S20). In this case, a one-line signal is thinned out every 12 lines.

Printing is carried out by using the above-thinned signal (S21).

After completion of printing, it is judged if the next operation is copying (S22). If it is copying, the copy 11/12 mode is reset (S23). If not, the reception 11/12 mode is reset (S24). That is, the 11/12 mode is released and the equi-magnification mode resumes after each reception, or each copying.

Steps S23 and S24 may be omitted. In this case, after the copy 11/12 key is depressed, an 11/12 reduction is always carried out unless the copy 11/12 key is released, or an 11/12 reduction of a reception is always carried out unless the 11/12 mode is reset by the software switch.

If on the contrary a copy mode is judged at step S14, a copy flag is set at step S30. If it is judged at step S31 that the apparatus is not set at the copy 11/12 mode (in a case where the copy 11/12 mode key has not been depressed), the wait time T is set at t1 (S32) to perform printing (S21). In this case, the mode becomes the equi-magnification mode. Alternatively, if it is judged at step S31 that the apparatus is set at the copy 11/12 mode, the wait time T is set at t2 and sub-scanning is thinned out to perform copying (S18 to S20). In this case, the mode becomes the 11/12 reduction mode. As described so far, by selecting the 11/12 reduction mode, the otherwise lacking portion of the image corresponding to the separation belt can be compensated for that the whole transmitted image or the copy image can be obtained. Further, since the 11/12 mode is preferentially selected during the reception mode and the equi-magnification mode is selected during the copy mode, it is very convenient for the operator.

In the above embodiment, the 11/12 mode performs a 11/12 reduction of an image signal in the laternal and longitudinal directions. However, other reduction ratios may be applied if only an effective recording area mode, by which an image is recorded within the effective recording area, is adopted. Such an effective recording area mode may be applied to both copy mode and reception.

The embodiment is also applicable to other facsimile apparatus using other than a laser beam printer. It is particularly useful for those printers having non-recording areas.

Figure 11:
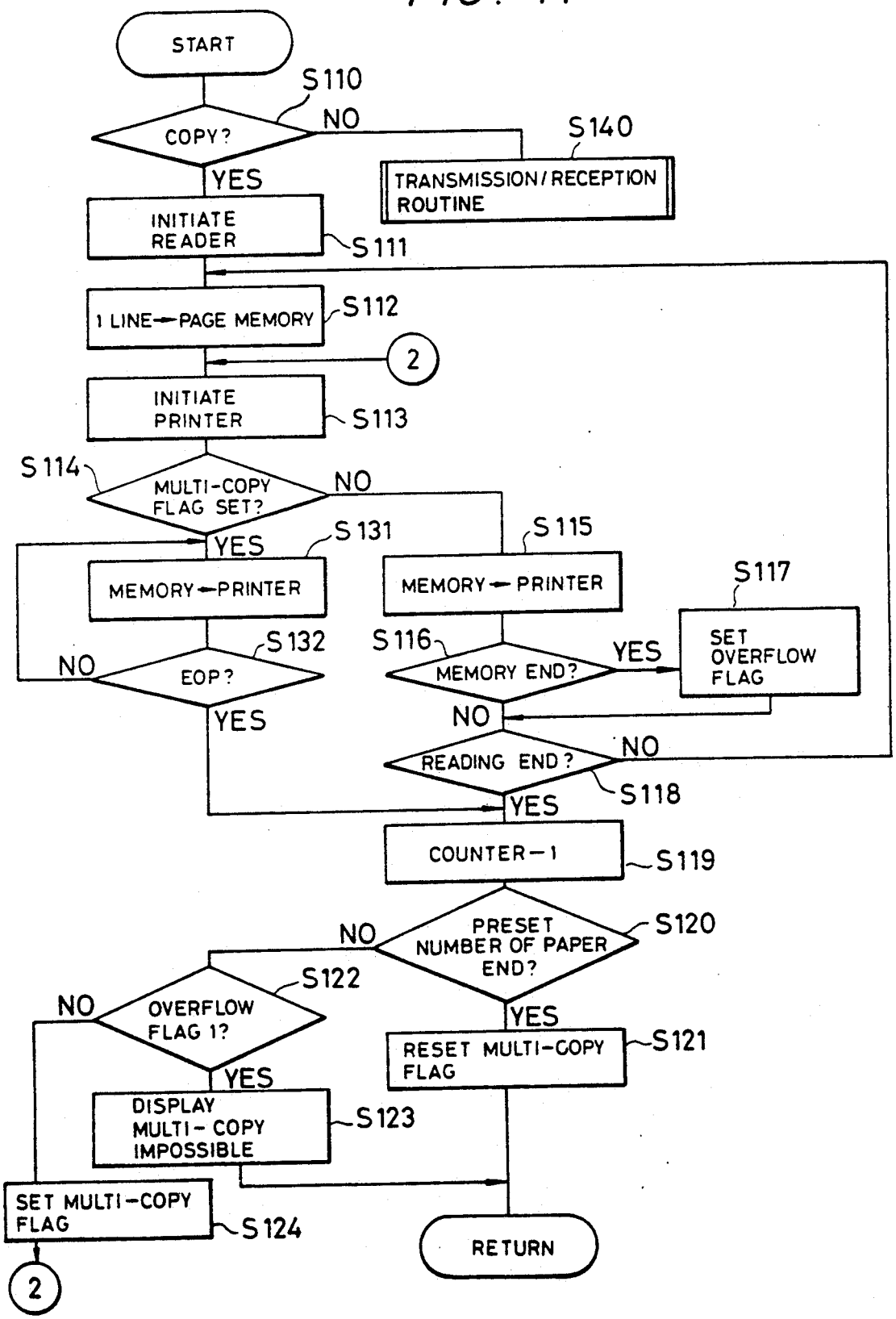
FIG. 11 is a detailed flow chart illustrating a control method of the image memory 10 in a copy mode.

Next, a control method of the image memory 10 in the copy mode will be described in detail with reference to the control flow chart of FIG. 11.

First, a copy mode or not is judged (S110). If not, a transmission/reception routine follows (S140).

In case of the copy mode, the reader 100 is initiated (S111) and one line of information read by the reader 100 is compression-coded into an intermediate code by the intermediate coder 22 to store it in the page memory of the image memory 10 (S112). Then, the printer 200 is initiated (S113) and thereafter, it is judged if a multi-copy flag is set (S114). Since the multi-copy flag is not set for a first copy, step S115 follows for the first copy.

At step S115, one line of information in the page memory is transferred to the printer 200 to print one line. Next, it is judged if any vacancy exists in the page memory (S116). If there is no vacancy, an overflow flag is set (S117) and the data in the page memory already recorded is erased to store newly read data therein.

Alternatively, if there is a vacancy, whether reading is at an end or not is immediately judged (S118). If not, the process returns to step S112 to read the next one line. Then, the printer is initiated to print the read-out image information. The above operations are repeated.

Therefore, from the start of a first copy to the end of reading of the original document, every time one line is read, printing is performed while storing the read-out information in the memory. With such arrangement, the time from the start of reading to the start of printing becomes short, thus hastening the end of printing.

In other words, the page memory functions as a line memory as well as the original page memory during a first copy.

When the reading and printing for the original document complete, the counter is decremented by 1 (S119). Subsequently, it is checked if copying has completed for the preset number of papers (S120). If not, or in the case of a multi-copy mode, it is judged if the overflow flag is 1 or not (S122). Since the overflow flag being 1 means that the original document data read at an earlier time has already been erased, a multi-copy cannot be carried out, so that an indication of "multi-copy impossible" is displayed by means of LEDs or the like (S123).

In a case where copying has not been completed for the preset number of papers and the overflow flag is not 1, a normal multi-copy operation is enabled. Then, the multi-copy flag is set (S124) and the flow returns to step S113.

For the second and following copies, image data from the page memory is recorded one line after another. First, the printer is initiated at step S113 and thereafter, the process advances to step S131 because the multi-copy flag has been set, and one line data in the page memory is output to the printer. Next, until an end-of-page signal EOP in the memory is detected at step S132, the operation at step S131 is repeated.

The counter is decemented by 1 every time recording of one copy is completed, and reading from the page memory and recording are repeated until the preset number of papers becomes 0. When copying completes for the preset number of papers at step S120, the multi-copy flag is reset at step S121.

According to the embodiment described in the foregoing, even if all the read-out data of an original document cannot be stored in the page memory, at least one copy can be obtained. Further, in this case, an indication of "multi-copy impossible" can be displayed upon an overflow of the page memory so that it is very convenient for the operator.

In the above embodiment, the printer 200 is initiated after one line is read. However, the printer 200 may be initiated after several lines are read.

Although a facsimile apparatus using a laser beam printer has been used in the above embodiment, other printers may be used instead. Also, instead of the facsimile apparatus, other apparatus such as a digital copying machine may be used.

Figure 12:
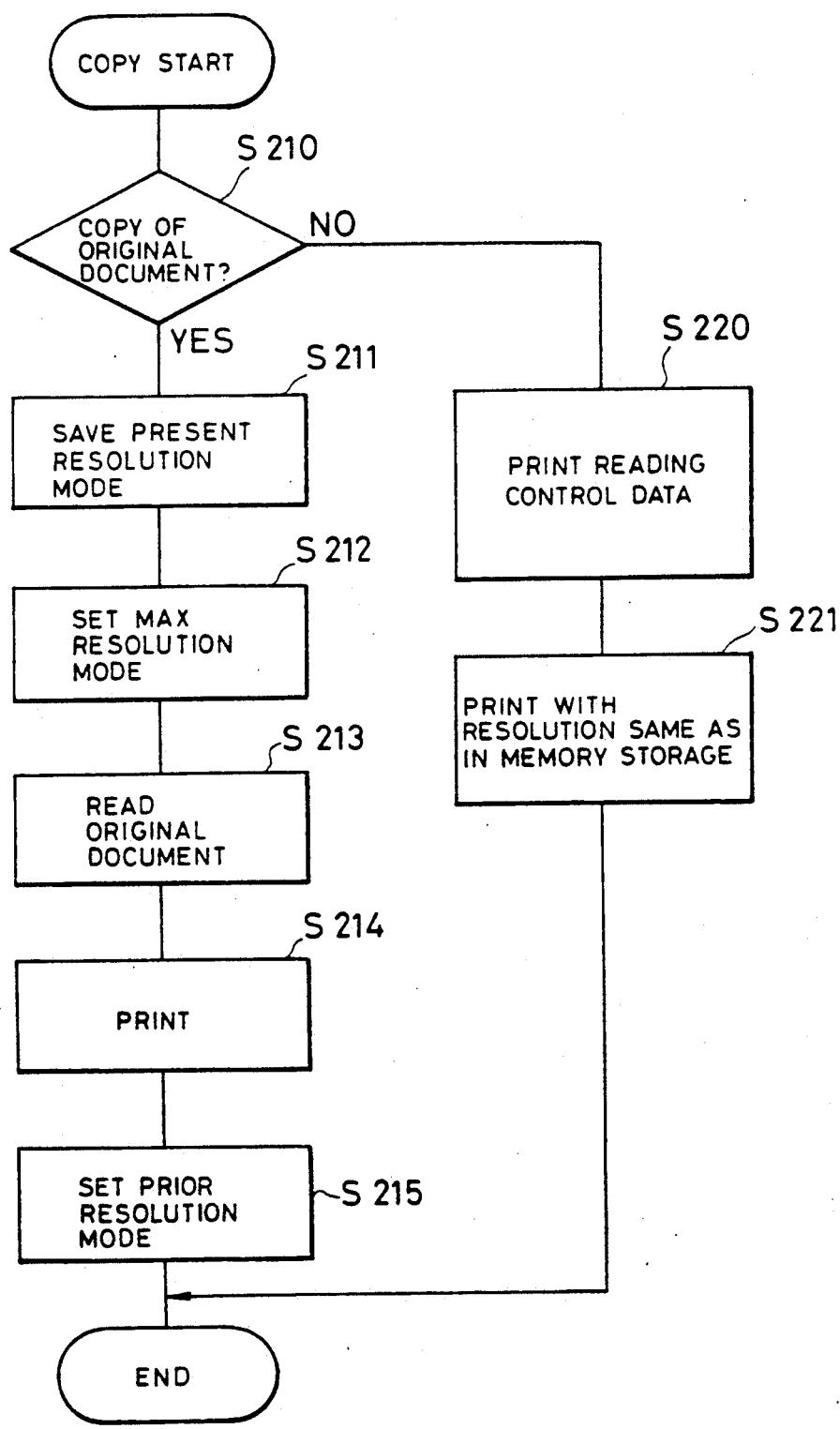
FIG. 12 is a flow chart illustrating control methods of a memory copy mode and an ordinary copy mode.

Next, the controls of the ordinary copy mode and the memory copy mode for copying data temporarily stored in the image memory 10 for transmission purpose, will be described with reference to the flow chart of FIG. 12.

First, to start copying, it is judged whether an original document is to be copied (copy mode) or the content stored in the memory is to be copied (memory copy) (S210). In the case of the copy mode, the present resolution mode is saved (S211).

For instance, in a facsimile apparatus having a standard mode (8 dots/mm $\times$ 3.85 lines/mm), fine mode (8 dots/mm $\times$ 7.7 lines/mm) and finest mode (16 dots/mm $\times$ 15.4 lines/mm), if the standard mode has been set, the standard mode is reset.

Then, the maximum resolution mode is set (S212). In the above example, the finest mode is set. The original document is read in this condition (S213) and printing is carried out (S214). After the end of the printing, the original resolution mode is set (S215). In the above example, the standard mode is set.

As seen from the above, since a copy is always obtained at the maximum resolution mode, the image quality thereof becomes good.

In the above "copy mode", a "memory copy" is not included. For the facsimile apparatus having only two resolutions, e.g., the standard mode and the fine mode, the fine mode becomes the maximum resolution in the above embodiment. Also, for the facsimile apparatus having more than two resolutions, the highest resolution among those resolutions is selected for max-resolution separation.

Alternatively, in the case of a memory copy mode at step S210, then reading control data is printed (S220). The reading control data is stored in a memory separately from the image memory 10.

After printing of the reading control data, the original document image stored in the image memory 10 is printed. The resolution in the memory copy mode is the same as that used while storing in the memory.

The reading control data includes resolutions, presence or absence of half tone, communication time, destination, page, number of all pages, and so on.

Figure 13:
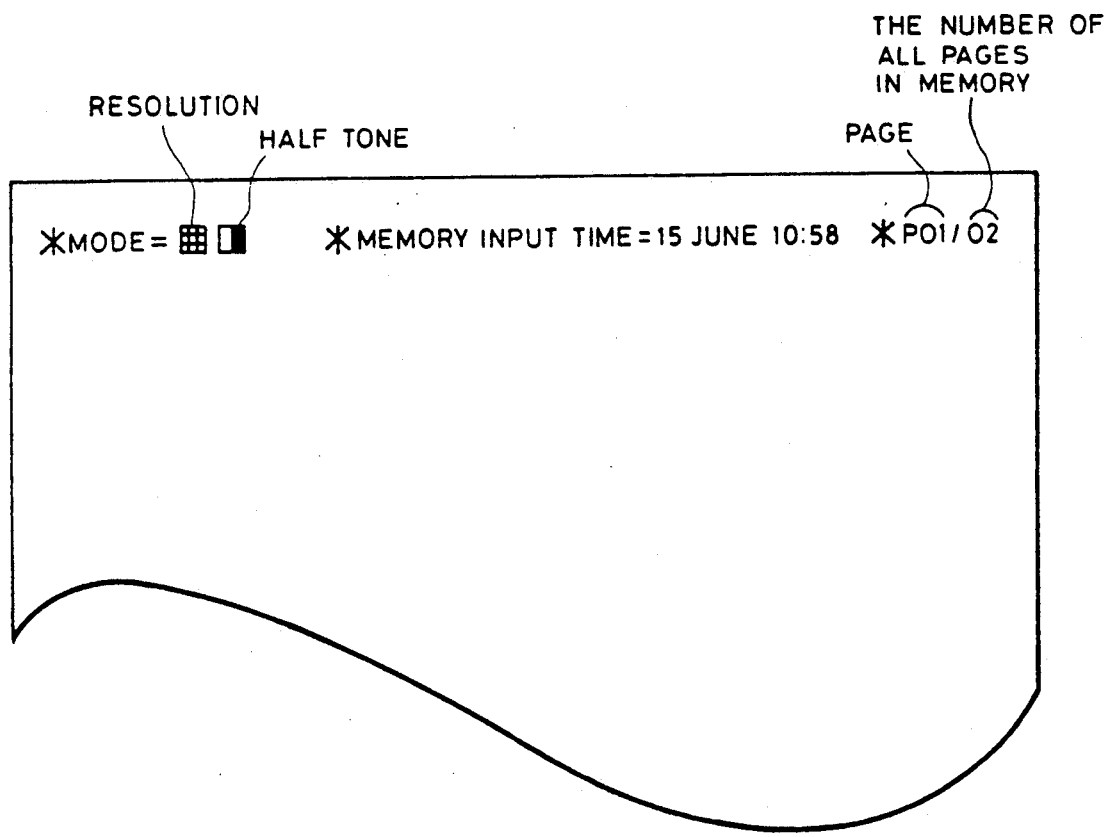
FIG. 13 shows an example of control data recorded on a recording paper in the memory copy mode.

FIG. 13 shows an example of a printing paper printed with the reading control data. After printing the reading control data, the resolution of the image data stored in the memory is the same as in memory storage (S221).

Printing of the reading control data allows an easy visual recognition of the conditions set for broadcast communication or the like.

In the above embodiment, a facsimile apparatus using a laser beam printer has been used. However, the present invention is also applicable to a facsimile apparatus using such as a thermal printer, heat transfer printer, ink jet printer or the like.

Figure 14:
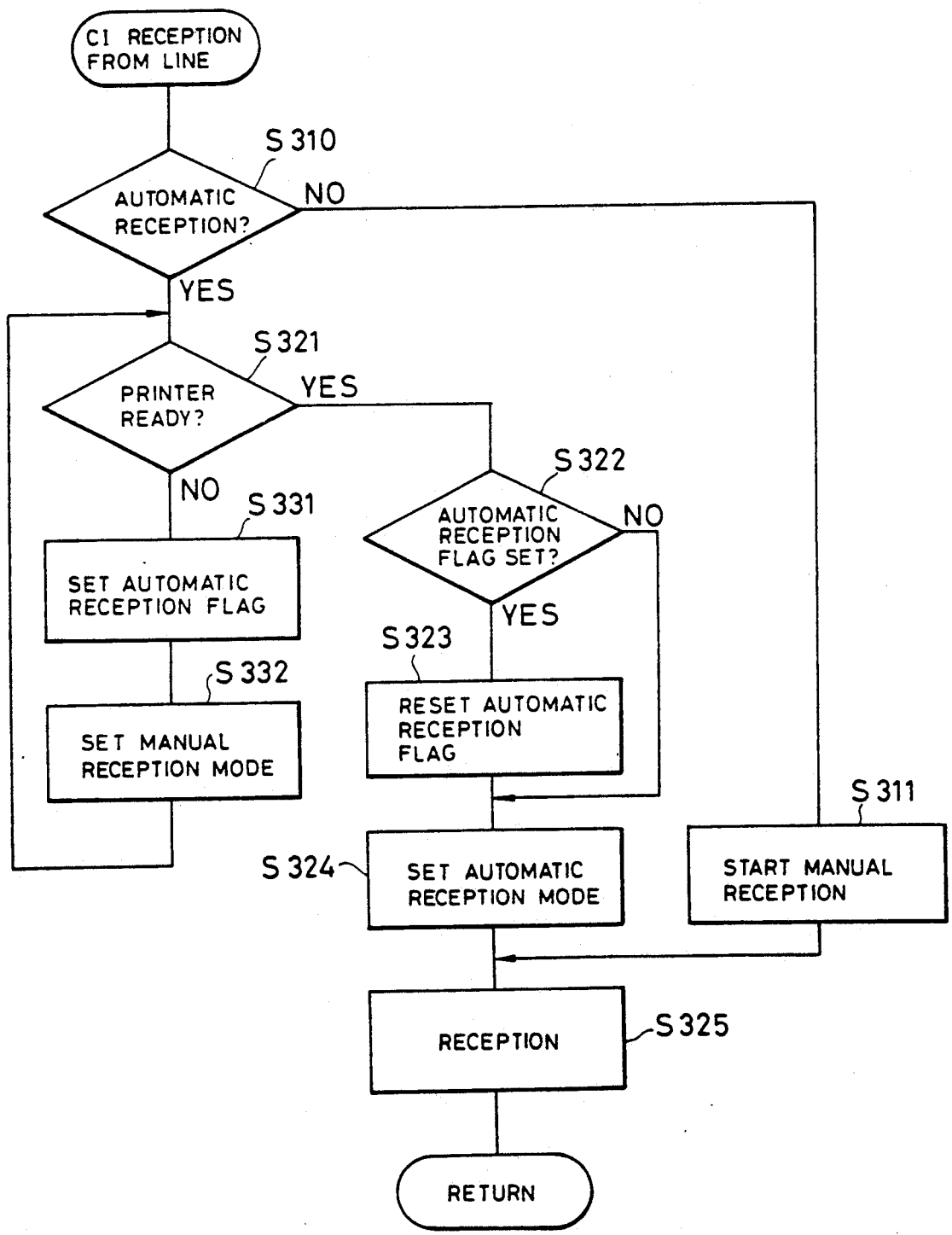
FIG. 14 is a flow chart illustrating a control method of switching between the automatic reception mode and the manual reception mode.

Lastly, the switching between the automatic reception mode capable of receiving without an operator and the manual reception mode with an operator, will be described with reference to the control flow chart of FIG. 14.

First, when a calling indicator signal CI is received from the line, it is judged if the apparatus is at the automatic receiving mode (S310). If not (i.e. the manual reception mode), the manual reception mode is made to start (S311). That is, a start button is pushed to start reception (S325).

Alternatively, if the automatic reception mode is set at step S310, the laser beam printer 200 is checked if it is ready (S321). This check is conducted by the LBP controller 35 based on the status of the printer interface.

The ready state of the printer 200 is judged in accordance with various signals from the sensors For instance, the presence of toner is detected by the toner density sensor 271, the temperature of the fixing unit is detected by the temperature sensor 272, and the presence of printing paper is detected by the LED 273 and the photoreceiving element 274.

If the printer 200 is ready, it is judged if an automatic reception flag is set (S322). If it is set, the automatic reception flag is reset (S323) and thereafter, the automatic reception mode is set to start reception (S325).

If the printer is not ready even when a CI signal is received from the sending station and if the automatic reception mode is set, the automatic reception flag is set (S331) and thereafter, the manual reception mode is set (S332). That is, the automatic reception mode is released to change to the manual reception mode. In this case, unless the manual reception mode is started, reception does not start.

Therefore, the telephone at the receiving side continues ringing in spite of the setting of the automatic reception mode, thus notifying the operator that the apparatus is not prepared for reception. On the other hand, at the sending station, no indication of error is displayed. When the printer becomes ready while the telephone rings, at steps S322, S323 and S324 the flag is set and the automatic reception mode resumes so that, for example, when the temperature of the fixing unit 250 rises to a predetermined level, automatic reception can be started efficiently.

In the above embodiment, the automatic reception mode is compulsorily changed to the manual reception mode if the printer is not ready. However, in other cases, such as an off-state of the power, the manual reception mode may compulsorily be set. Further, the present invention is also applicable to other facsimile apparatus using a printer other than a laser beam printer.

As seen from the above description of the embodiments of the present invention, an image communication apparatus can be realized which has leaves no portions lacking from the reproduced image.

Further, an image communication apparatus can be realized which can adjust the image center as desired.

Furthermore, an image reproducing apparatus can be realized which can shorten the time required for a multi-copy.

Still further, an image communication apparatus can be realized which retains the best copy quality in the copy mode.

Still, further an image communication apparatus can be realized which can readily visualize together with the image, various data regarding the image stored in the memory in the memory copy mode.

Further, according to the invention, in the automatic reception mode and during the time when the apparatus is not prepared for reception, e.g., no printing paper in the apparatus, an error signal is not sent to the calling station, while on the other hand the called station can be notified by the telephone ringing that the apparatus is not prepared, or can call the calling station and explain such situation. Thus, it is very convenient for the operator.

The present invention is not limited to the above embodiments, but various applications and modifications are possible within the scope of the appended claims.

What is claimed is:

1. An image forming apparatus comprising:
   reading means for reading original document image formation to obtain an image signal;
   storage means for storing the image signal;
   recording means for recording image information stored in said storage means;
   control means for sending, before all of the image information corresponding to the original document is stored in said storage means, the image information to said recording means to perform a first recording, and after all of the image information corresponding to the original document is stored in said storage means and after said first recording is completed, performing second and following recordings by said recording means; and
   display means for displaying that second and following recordings are impossible when said storage means cannot store all of the image information corresponding to the original document.

2. An image reproducing apparatus according to claim 1, wherein said storage means stores a compression-coded image signal.

3. An image communication apparatus comprising:
   reading means for reading an image of an original document at any of a plurality of resolutions;
   storage means for storing image information obtained by said reading means in a memory copy mode;
   transmission means for transmitting image information in said storage means;
   recording means for recording in an ordinary copy mode, original, not stored, image information of said original document received from said reading means and for recording in the memory copy mode, image information already stored in said storage means; and
   setting means for automatically setting said reading means to read said original document image at a maximum resolution when said image information is to be recorded in said ordinary copy mode.

4. An image communication apparatus comprising:
   reading means for reading an image of an original document at any of a plurality of resolutions;
   storage means for storing image information obtained by said reading means in a memory copy mode;
   transmission means for transmitting image information in said storage means;
   recording means for recording image information; and
   control means having a first mode for controlling said recording means to record, original, not stored, image information of said original document received from said reading means, and a second mode for recording image information stored in said storage means for transmission, wherein, in the first mode, said control means sets said reading means to read said original document image at a maximum resolution so as to record the obtained image information at a maximum resolution, while, in the second mode, the control means controls the stored image data to be recorded at the resolution said data was stored.

5. An image recording apparatus according to claim 4, wherein said storage means stores a compression-coded image signal.

6. An image communication apparatus comprising:

reading means for reading an image of an original document at any of a plurality of resolutions;

manual selection means for selecting one resolution from the plurality of resolutions of said reading means;

first memory means for storing image information obtained by said reading means;

second memory means for storing data indicating the resolution of the image information corresponding to the image information of said first memory means;

recording means for recording image information; and control means for setting said reading means to the resolution selected by said manual selection means and for controlling the recording of the image information by said recording means; wherein said control means has a first mode, for causing said recording means to record the image information of said first memory mean according to the resolution data of said second memory means, and a second mode, for setting the resolution of said reading means to a maximum resolution regardless of the selection by said selection means and for causing said recording means to record the image information of the original document read by said reading means at said maximum resolution.

7. An image communication apparatus according to claim 6, further comprising transmission means for transmitting image information of said first memory means.

8. An image communication apparatus according to claim 6, wherein said first memory means stores a compression-coded image signal.

* * * * *

UNITED STATES PATENT AND TRADEMARK OFFICE
CERTIFICATE OF CORRECTION

PATENT NO. : 5,099,335

DATED : March 24, 1992

INVENTOR(S) : YOSHIAKI KATO

It is certified that error appears in the above-identified patent and that said Letters Patent is hereby corrected as shown below:

In the drawings:

SHEET 5 OF 12

Figure 6:
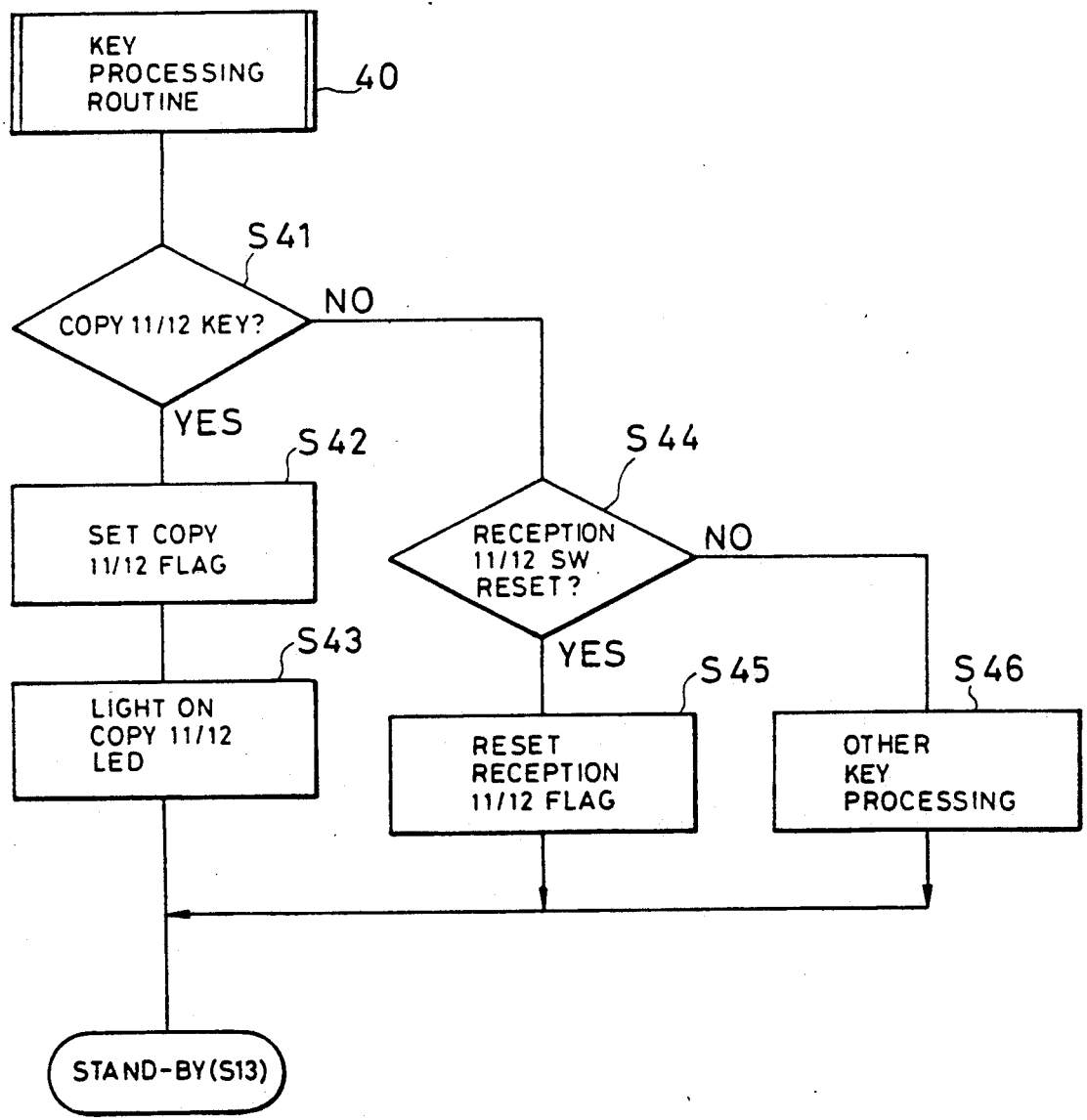
FIG. 6 is a flow chart illustrating a key processing routine.

FIG. 6, "40" should read --S40--.

COLUMN 1

Line 35, "ann" should read --an--.
Line 37, "multicopy" should read --multi-copy--.

COLUMN 2

Line 18, "after" (first occurrence) should be deleted.
Line 22, "half tone," should read --halftone,--.

COLUMN 4

Line 49, "multiplexer 3;" should read --multiplexer 43;--.

COLUMN 5

Line 34, "a" should read --an--.
Line 46, "step" should read --process--.
Line 65, "t1" should read --t2--.

COLUMN 6

Line 26, "a" (first occurrence) should read --an--.
Line 27, "Sub scan-" should read --Sub-scan- --.
Line 57, "for that" should read --for so that--.
Line 63, "a" should read --an--.
Line 64, "laternal" should read --lateral--.

UNITED STATES PATENT AND TRADEMARK OFFICE
CERTIFICATE OF CORRECTION

PATENT NO. : 5,099,335
DATED : March 24, 1992
INVENTOR(S) : YOSHIAKI KATO

It is certified that error appears in the above-identified patent and that said Letters Patent is hereby corrected as shown below:

COLUMN 7

Line 41, "complete," should read --is completed,--.

COLUMN 8

Line 6, "memory so" should read --memory, so--.
Line 47, "separation." should read --operation.--.
Line 57, "half tone," should read --halftone,--.

COLUMN 9

Line 19, "sensors  For" should read --sensors.  For--.
Line 59, "has" should be deleted.

COLUMN 10

Line 1, "Still, further" should read --Still further,--.
Line 2, "visualize" should read --visualize,--.
Line 21, "formation" should read --information--.

UNITED STATES PATENT AND TRADEMARK OFFICE
CERTIFICATE OF CORRECTION

PATENT NO. : 5,099,335
DATED : March 24, 1992
INVENTOR(S) : YOSHIAKI KATO

Page 3 of 3

It is certified that error appears in the above-identified patent and that said Letters Patent is hereby corrected as shown below:

COLUMN 12

Line 11, "mean" should read --means--.

Signed and Sealed this

Twenty-fourth Day of August, 1993

Attest:

BRUCE LEHMAN

Attesting Officer    Commissioner of Patents and Trademarks